March 9, 1937. R. B. LEWIS 2,073,070
FLUID PRESSURE REGULATOR
Original Filed Oct. 12, 1932
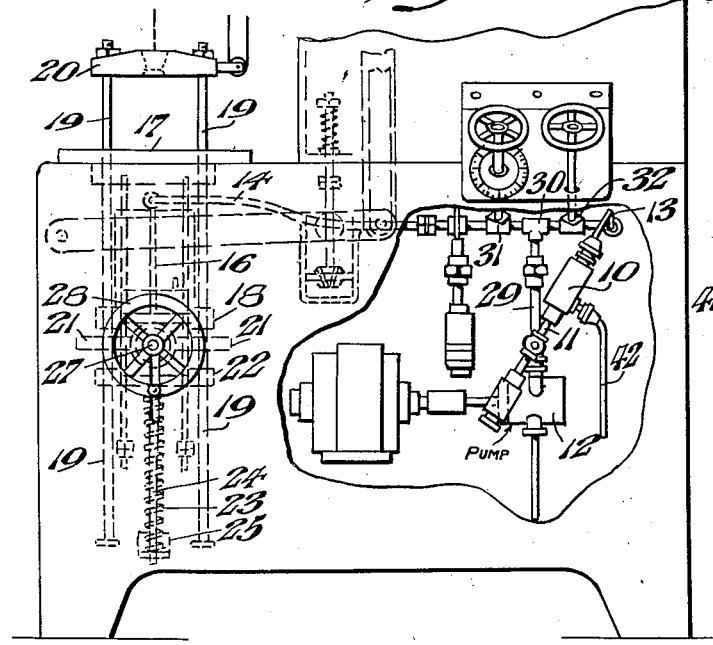
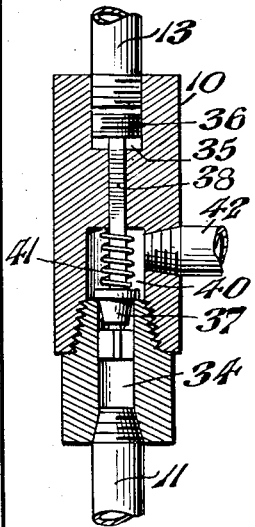
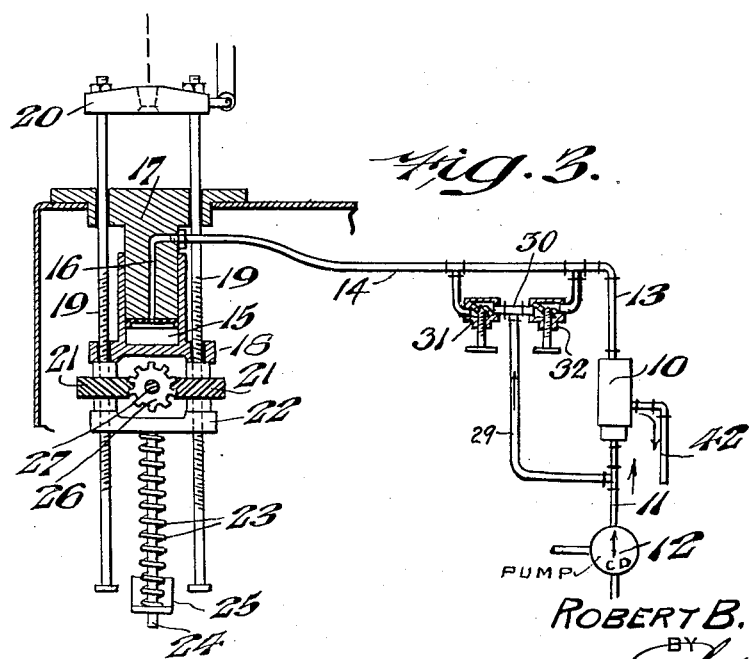
INVENTOR
ROBERT B. LEWIS.
BY
Robert M. Barr
ATTORNEY Patented Mar. 9, 1937

2,073,070

UNITED STATES PATENT OFFICE 2,073,070

FLUID PRESSURE REGULATOR

Robert B. Lewis, Philadelphia, Pa., assignor to Tinius Olsen Testing Machine Company, Philadelphia, Pa., a corporation of Pennsylvania Original application October 12, 1932, Serial No. 637,394. Divided and this application September 26, 1933, Serial No. 690,993

2 Claims. (Cl. 60—52)

The present invention relates to control valves for testing machines and more particularly to a valve for maintaining a uniform rate of loading for a testing machine by a fluid under pressure.

This application is a division of applicant's co-pending application, Serial No. 637,394, filed October 12, 1932, for Universal testing machine.

Some of the objects of the present invention are to provide an improved control valve for maintaining a uniform rate of travel of a movable part actuated by fluid under pressure; to provide a control valve for insuring a constant rate of loading for a testing machine or other apparatus dependent for operation upon fluid pressure; to provide a control valve having different effective areas so that there is a differential action of the valve in operation which functions as a control to maintain a constant rate of loading by the pressure fluid; to provide a valve for use in hydraulic systems wherein there is normally an increase of pressure as the load is applied and which valve operates to build up a pressure at some predetermined established rate; to provide a valve operating through a differential action in such a manner as to obtain high pressures at a faster rate than heretofore and which rate is dependent upon the rate of differential action; to provide a novel valve mechanism for regulating the flow from a pump; and to provide other improvements as will hereinafter appear.

In the accompanying drawing Fig. 1 represents a side elevation of a portion of a hydraulic operated testing machine broken away to show the control valve which embodies one form of the present invention; Fig. 2 represents on a larger scale a longitudinal section of the control valve in association with its piping to the pressure fluid supply and the cylinder of a testing machine; and Fig. 3 represents diagrammatically the assembled association of the regulator.

Referring to the drawing one form of the present invention consists of a valve casing 10 arranged to communicate at one end with the discharge pipe 11 of a pump 12 and at the other end by a pipe 13 with a pressure fluid supply pipe 14 leading to a load applying device such as the movable cylinder 15 of a hydraulic operated testing machine. In the machine to which the present invention is applied as an example of its use the conduit 14 is in communication with a port 16 which extends longitudinally of a fixed piston member 17 and opens against the head of the cylinder 15 to cause the latter to move relative thereto under the applied pressure of the actuating fluid. As here shown the cylinder is slidably mounted upon the piston 17 and its flanged head 18 is guided upon two lead screws 19 which extend in opposite directions therefrom, the upper ends thereof being guided through the fixed piston for bolting engagement with a crosshead 20 to which the test piece is arranged to be secured for testing purposes as well known in this type of apparatus. Preferably the head 18 seats on the hubs of the two spur gears 21 which are threaded upon the lead screws 19, while a yoke 22 bears against the opposite hubs of the gears 21. A spring 23 is coiled about a rod 24 and reacts against a fixed abutment 25 to hold the yoke 22 pressed upwardly whereby the cross head 20 is automatically returned to its initial set position when the loading of the machine ceases. A gear 26 is mounted for rotation between the gears 21 and in mesh therewith to transmit under manual control motion necessary to bring the cross head to zero load position. The spindle 27 of the gear 26 is controlled by a suitable hand wheel 28.

For the purpose of supplying the pressure fluid from the pump 12 to the port 16, the pipe 11 is connected to a supply pipe 29 which terminates in a T-fitting 30 having branches leading through regulating valves 31 and 32 to the pipes 13 and 14. For controlling the pressure fluid to maintain a selected rate of loading, the casing 10 is provided with two coaxially located bores 34 and 35, the former, for more definite identification, being called the pressure supply bore 34 and the latter the back pressure bore 35. It should however be particularly noted that the diameter of the bore 35 is greater than that of the bore 34 in order to give the novel differential action desired. Pressure fluid is led to the back pressure bore 35 by the pipe 13 where it acts against a piston 36 to vary the response of a check valve 37 to pressure from the pump discharge pipe 11. A valve stem 38 interconnects the piston 36 and the check valve 37 and has a bearing in the body 10 between the bore 35 and a chamber 40, the latter being in communication with the bore 34 when the check valve 37 is open. A coil spring 41 encircles the stem 38 and is adjusted to give a predetermined closing pressure to the check valve 37, and this adjustment comprehends a pressure to maintain the valve 37 closed as long as the rate of flow through the pipe 29 is uniform. Any change of such rate is followed by a building up of the pressure in the discharge line from the pump, and will thus cause the valve 37 to open and by-pass all or a part of the discharge by way of a return pipe 42 which leads from the chamber 40 to the fluid supply reservoir. In order to adjust for a predetermined rate of flow either the regulating valve 31 or 32 is initially opened or both opened sufficiently to adjust for the desired predetermined rate of flow of liquid to the pipe 14. It is the difference in pressure between opposite sides of the valves 31 or 32 which determines the amount of liquid passing the opening in the opened valve as will be understood. It is this regulated flow of liquid under pressure through the pipe 14 which causes the cylinder 15 to move and place the cross-head or yoke 20 under load. As the loading pressure increases the back pressure reacts through the fluid and by way of the pipe 13 upon the piston 36. This back pressure holds the valve 37 in the closed position until the pump builds up enough pressure to overcome it, which, because of the fact that the piston 36 is larger in cross sectional area than the valve 37, must be greater than the back pressure by a certain fixed proportion. The result is that when the pump is in operation and the valves are partly open, the pressure between the pump and the valves is always greater by a fixed proportion than the pressure between the valves and the cross-head. Although the actual quantitative difference in pressure becomes greater as the pressure on the whole system increases, the difference in pressure is still proportioned to the pressure on the system and increases in quantity only with sufficient rapidity to compensate for the increased leakage and increased resistance to flow in the system. Thus, the result is a uniform rate of loading for the testing machine.

In the operation of the pressure control of the present invention the spring 41 is initially set for no load conditions in the flow of fluid from the pump 12. To regulate the loading pressure and establish a predetermined rate of loading either or both the regulating valves 31 and 32 is opened until the desired rate is established. With this rate fixed and the cross-head 20 moving under the applied load any increase in back pressure is transmitted by the pipes 14 and 13 to the piston 36 thereby increasing the pressure on the by pass valve 37 above the pressure exerted by the pre-loading spring 41. This combined effect proportionately increases the closing effort so that a difference in pressure is maintained between the bore 34 and the chamber 40 which is variable in a manner depending upon the operating pressure. If for any reason it is desired to increase the rate of loading without changing the set condition of the opened valve either 31 or 32, the other valve can be opened, but when the latter is again closed the predetermined or set rate of flow is resumed.

While only a single form is shown in which this invention may be embodied, it is to be understood that the invention is not limited to any specific construction, but might be applied to various forms without departing from the spirit of the invention or the scope of the appended claims.

Having thus described my invention, I claim:—

1. A control mechanism comprising the combination of a pump, a load applying mechanism, a conduit for pressure fluid leading from said pump to said load mechanism, a control valve in said conduit for adjusting the rate of flow therethrough, a casing having a conduit forming a by-pass for fluid discharged from said pump, a spring actuated check valve for controlling said by-pass, a piston having an operating area greater than the like area of said check valve, means to transmit movement of said piston to said check valve to supplement the action of said spring, and means including a pipe for subjecting said piston to the back pressure from said loading mechanism.

2. A system for supplying fluid against an increasing head at an adjustable rate that comprises a fluid pump, a throttle valve through which the fluid passes from the pump to the point at which it is to be supplied, a surface exposed to the pressure of the fluid on each side of the throttle valve, the surface between the pump and the throttle being slightly smaller than the surface on the other side of the throttle, and a valve for by-passing fluid from the pump, said valve being connected for operation to the two surfaces in such a manner that the valve will open when the pressure between the pump and the throttle exceeds that beyond the throttle by a pre-determined proportion.

ROBERT E. LEWIS.